US006943298B2

(12) United States Patent
Nicholson

(10) Patent No.: US 6,943,298 B2
(45) Date of Patent: Sep. 13, 2005

(54) ELECTRICAL CONNECTORS

(75) Inventor: Allan Nicholson, Barrow-in-Furness (GB)

(73) Assignee: Diamould Limited, Barrow-in-Furness (GB)

( * ) Notice: Subject to any disclaimer, the term of this patent is extended or adjusted under 35 U.S.C. 154(b) by 0 days.

(21) Appl. No.: 10/451,270

(22) PCT Filed: Dec. 20, 2001

(86) PCT No.: PCT/GB01/05692

§ 371 (c)(1),
(2), (4) Date: Jun. 23, 2003

(87) PCT Pub. No.: WO02/50958

PCT Pub. Date: Jun. 27, 2002

(65) Prior Publication Data

US 2004/0058575 A1 Mar. 25, 2004

(30) Foreign Application Priority Data

Dec. 20, 2000 (GB) ............................................ 0031003

(51) Int. Cl.[7] ................................................ H02G 15/06
(52) U.S. Cl. ...................................................... 174/74 R
(58) Field of Search ............................ 174/74 R, 75 R, 174/74 A, 75 B; 439/198

(56) References Cited

U.S. PATENT DOCUMENTS 3,945,700 A 3/1976 Didier ........................ 439/589
4,693,540 A 9/1987 Cane .......................... 439/198
4,728,296 A * 3/1988 Stamm ....................... 439/275
5,670,747 A 9/1997 Lawer et al. ............ 174/74 R

FOREIGN PATENT DOCUMENTS

GB 2 338 119 A 12/1999

* cited by examiner

*Primary Examiner*—Chau N. Nguyen
(74) *Attorney, Agent, or Firm*—Dykema Gossett PLLC

(57) ABSTRACT

An electrical connector and method of making the electrical connection are disclosed for use in particularly arduous conditions, such as down hole oil production applications. The invention provides high electrical integrity with an ability to accommodate steady and/or fluctuating mechanical forces placed via the cable into the connector. Synergy between the mechanical and electrical aspects of the design is taught in which an insulating member, fitted with annular upstands, co-operates with a mechanically soft, essentially incompressible, insulating substance (gel) to cause vibrations in the cable to be dissipated over a length of the insulated cores inside the connector rather that at a single point where it would cause the core to fracture. In addition, annular collars of the gel are provided between the insulating member and the crimped pin-core connections and between the annular upstands and insulated cores to give further cushioning. Because the core insulation sits deep inside the annular upstand of the insulating member and gel collars, this creates a good electrical interface with a long creepage distance. The method covers the creation of the gel collars, alignment of contact pins and insulated cores and assembly of the connector.

27 Claims, 10 Drawing Sheets

ELECTRICAL CONNECTORS

BACKGROUND OF THE INVENTION

This specification relates to electrical connectors which have to carry very high powers in compact spaces in hostile environments and covers both the connector design and method of assembling it in the field.

The oil production industry has to contend with some of the most inhospitable conditions anywhere. These include wide temperature variations, e.g. −40° C. (storage of equipment in Alaska) to +120° C. (downhole), thermal shock, high pressures and highly corrosive, abrasive environments. A further, and frequently major, factor is mechanical shock and fatigue due, particularly, to vibration caused by fluid flow past the connector. A typical installation is shown in FIG. 1 where wellhead 1 is shown on seabed 2. Hole liner 4 is suspended from tubing hangar 3 and supports a number of items, e.g. electrical submersible pump (ESP) 5, which is powered via protected cable 6. A key item is the motor lead extension (MSE) connector 7, which is sometimes known as a 'pothead'.

This specification deals particularly with connectors 7 such as this, which are inaccessible once in position and have to last, at least, for the lifetime of pump 5.

Previous experience with currently available connectors 7 has been unsatisfactory as the factory made units often suffer from problems relating to temperature variations, and the resultant mechanical stresses generated and electrical failure due to movement of the contacts under thermal, or operating pressure, effects. One particular problem is vibration, induced by the high flow rate of oil and/or gas in liner 4. Another factor is that cable 6 must be cut to the exact length so that there is a minimum of free cable as slackness can result in cable damage due to fretting and/or impacts as the cable whips around in liner 4. High frequency vibrations, even though of only small amplitude, can, over a period of time, have a significantly damaging effect on a cable, e.g. fatigue, chafing of insulation, etc.

Cable 6 is attached to connector 7 and it is this which effectively has to provide the 'reaction' to these vibrations. Thus, the cores inside connector 7 are subject to high frequency, cyclical, axial and bending forces. The effect of these forces is to weaken the connection both mechanically and electrically and, usually, lead to premature electrical failure, with consequent serious loss of production.

As explained, the connector provides the 'mechanical reaction', i.e. acting in a pin-jointed or encastrè capacity. Some current connectors use a multiple metal-rubber disc compressed sandwich to form the seal. This can leak due to the effects of thermal cycling and set when the rubber does not fully recover its previous size on cooling (in operating practice, it is common to have to shut down the well, either for downhole maintenance or for work on the seabed or surface equipment; this allows cycling from 100+° to 4° C. {sealed temperature} and back.) Here the reaction point is where the conductor enters the crimped or soldered joint. In others, moulded rubber is used and here the reaction point is where the insulated core enters the rubber insulator. Clearly, there is a need to spread the reaction over as long an axial length as possible to minimise fatigue effects.

Current practice is for cables 6 and connectors 7 to be factory assembled in fixed lengths, often 16.76 m (55 ft). Though means-to shorten cables, e.g. by coiling, etc., are known, space is extremely limited in liner 4 and wellhead 1. Furthermore, cable 6 is armoured and not easily bent. Additionally sharp bends place unnecessary stresses in the cable.

There is thus a need for a high powered, precision-made electrical connector which can be assembled on site, quickly and reliably and to exact lengths, preferably by semi-skilled personnel. Preferably, such connectors should be able to accommodate external forces placed on them without deterioration.

SUMMARY OF THE INVENTION

According to the invention, there is provided an electrical connector connecting a cable to a powered item/further connector comprising;

i) a multicored, insulated electrical cable;

ii) electrical connections securing individual cores to individual contact pins;

iii) individual contact pins positively engageable within an insulating member;

iv) a flexible boot, defining, with the insulating member, an interior which is filled with a mechanically soft, essentially incompressible, electrically insulating substance;

v) a housing providing a seal with the insulating member and also with the powered item/further connector; and vi) a clamp able to grip and secure the electrical cable into the housing;

wherein annular channels are provided between the insulating member and the contact pins, the mechanically soft, essentially incompressible, electrically insulating substance forming cushioning in the annular channels, the connector being arranged so that, when assembled, where external forces are placed on the connector via the cable, they are dissipated progressively over an extended length of the insulated portions of the cores inside the connector and where the ends of the contact pins not secured to the cable cores are connectable to the powered item/further connector.

According to a first variation of the apparatus of the invention, the annular channels are in communication with the interior.

According to a second variation of the apparatus of the invention, the individual cores are secured to contact pins by crimping.

According to a third variation of the apparatus of the invention, circlips provide the positive engagement for the individual contact pins within the insulating member and O-rings provide sealing to exclude the operating environment from the area of the electrical connections.

According to a fourth variation of the apparatus of the invention, the insulating member is provided with annular upstands around the individual electrical conductors as they enter the insulating member.

According to a fifth variation of the apparatus of the invention, the annular upstands around the individual electrical conductors as they enter the insulating member are cylindrical in form.

According to a sixth variation of the apparatus of the invention, the mechanically soft, essentially incompressible, electrically insulating substance is cast in position as a liquid and subsequently polymerised.

According to a seventh variation of the apparatus of the invention, the mechanically soft, essentially incompressible, electrically insulating substance is cast in position in a way to avoid incorporation of air bubbles.

According to an eighth variation of the apparatus of the invention, annular channels are also provided between parts of the insulating member and the insulation of said insulated portions of the cores, the mechanically soft, essentially incompressible, electrically insulating substance forming cushioning in those annular channels.

According to a ninth variation of the apparatus of the invention, the annular channels provided between parts of the insulating member and the insulated cores are right cylindrical in form.

According to a tenth variation of the apparatus of the invention, the annular channels provided between parts of the insulating member and the insulated cores are in the form of conical cylinders.

According to an eleventh variation of the apparatus of the invention, the mechanically soft, essentially incompressible, electrically insulating substance is cast in position as part of the pre-assembly stages.

According to a twelfth variation of the apparatus of the invention, a forming tool is provided for use in the pre-assembly stages to fill the flexible boot with mechanically soft, essentially incompressible, electrically insulating substance.

According to a thirteenth variation of the apparatus of the invention, jigs and/or tools are provided for use in the final stages of assembly-to prepare the cable insulation prior to crimping and to align the contact pins and insulated cores for fitting into the insulating member.

According to the invention, there is disclosed a method of making an electrical connection comprising the steps of:

i) providing the components for the connection;

ii) fitting a flexible boot over an insulating member, iii) filling the void inside the boot with a mechanically soft, essentially incompressible, electrically insulating substance in such a way that space is provided for contact pins and insulated cores to be fitted at a subsequent time;

iv) fitting the filled insulating member-boot sub-assembly into the housing and creating a seal between the sub-assembly and the housing;

v) tag a multicored electrical cable and cutting to length;

vi) placing the cable grip over the cable;

vii) preparing an appropriate length of insulation on each conductor and baring the requisite length of each core;

viii) inserting each bared conductor into a prepared part of a contact pin and securing in position;

ix) bending the conductor-pin assemblies to align the conductors and pins to fit the spaces provided in the boot and mechanically soft, essentially incompressible, electrically insulating substance and insulating member, x) inserting each contact pin and connector sub-assembly through holes in the boot, through passages in the mechanically soft, essentially incompressible, electrically insulating substance and into the insulating member;

xi) causing the contact pins to engage positively with the insulating member and form a seal with the insulating member; and xii) securing the cable clamp.

According to a first variation of the method of the invention, a hand tool is provided to define the passages for the insulated cores in order to fill the boot with a mechanically soft, essentially incompressible, electrically insulating substance.

According to a second variation of the method of the invention, the mechanically soft, essentially incompressible, electrically insulating substance is placed inside the flexible boot using a syringe.

According to a third variation of the method of the invention, a hand operated tool is provided to prepare the insulation on the conductors and cut and remove insulation to expose the correct length of cores.

According to a fourth variation of the method of the invention, a template is provided to align the contact pins and conductors to fit the insulating member.

In a preferred example, the cable ending connector is partly pre-prepared before supply. The steps are fitting the flexible boot to the insulating member and filling the boot with a mechanically soft, essentially incompressible, electrically insulating substance. A forming tool is used to define the passages through which the pin and conductor assemblies will pass into the insulating member. The substance is preferably introduced as a monomer and hardener mixture in a way to avoid the incorporation of air bubbles into the liquid, e.g. using a syringe stuck through the boot. As the inviscid liquid flows in, the assembly is rotated and tilted so that the liquid fills every part of the boot, including channels between parts of the forming tool and upstands on the insulating member. When full, the polymer mixture inside the insulator boot assembly is polymerised, e.g. by placing in a warm oven for a period of time.

Internal circlips are placed into the bores of the insulating member where the contact pins will fit. The insulator-boot assembly is fitted into the housing with its O-ring seal. O-rings are also fitted to the contact pins, which are bagged to maintain cleanliness. The separate items, as described including cable clamp, are supplied to the client On site, the assembler cuts the cable to length so that it has a square end. Armoured cables, are usually used for down hole applications in the oil industry. The armouring is removed and the insulation on the conductors prepared, preferably using special tools provided. The cable clamp is placed over the cable. A further tool is used to prepare the insulation on the cores and expose the requisite lengths of cores. A contact pin secured to each core. Crimping is preferred as it is a less critical operation than, say, soldering and so a semiskilled person would be less likely to produce a suspect connection.

A jig is provided to align the crimped contact pins and conductors so that they can be inserted into the insulator-boot assembly through an aperture in the housing. The aligned contact pins and insulated conductors are sprayed with a lubricant so that they pass through the mechanically soft, essentially incompressible, electrically insulating polymer into the insulating member. The pins positively engage with the circlips, previously placed in the insulating member and the O-rings form a seal. The final stage is to fit the cable clamp which also closes the aperture in the housing.

A key advantage of this form of assembly is that a highly developed electrically and mechanically designed connector will be fitted correctly because the critical operations are performed by the manufacturer and the final assembly, which of necessity must be performed on site, is reduced to a series of simple operations by the use of specially provided jigs and tools. Clearly, critical operations could be performed on site by a skilled person but this relies on him/her being available at the particular time to perform these operations and having the required facilities to hand. As this connector is designed for a critical application, production cannot be jeopardised by the risk of a poorly made connection Preferably the mechanical and electrical design incorporates annular upstands surrounding the insulated cores as they enter the insulating member. Between these annular upstands and the insulated cores are channels filled with the mechanically soft, essentially incompressible, electrically insulating substance. The form of these upstands and channels are essentially cylindrical and may be right cylinders, conical cylinders, or any combination of these forms. A further channel may be provided between the insulating member and the crimped portion of core-pin connection. The interactive design of the annular upstands and filled channels provides both an optimal electrical environment to accommodate the passage of electrical current from cable to contact pins as well as an ideal mechanical design to dissipate vibration, flexure and other mechanical forces in the cable which are applied to the connector.

BRIEF DESCRIPTION OF THE DRAWINGS

For a clearer understanding of the invention and to show how it may be put into effect, reference will now be made, by way of example only, to the accompanying drawings in which.

DESCRIPTION OF THE INVENTION

Figure 1:
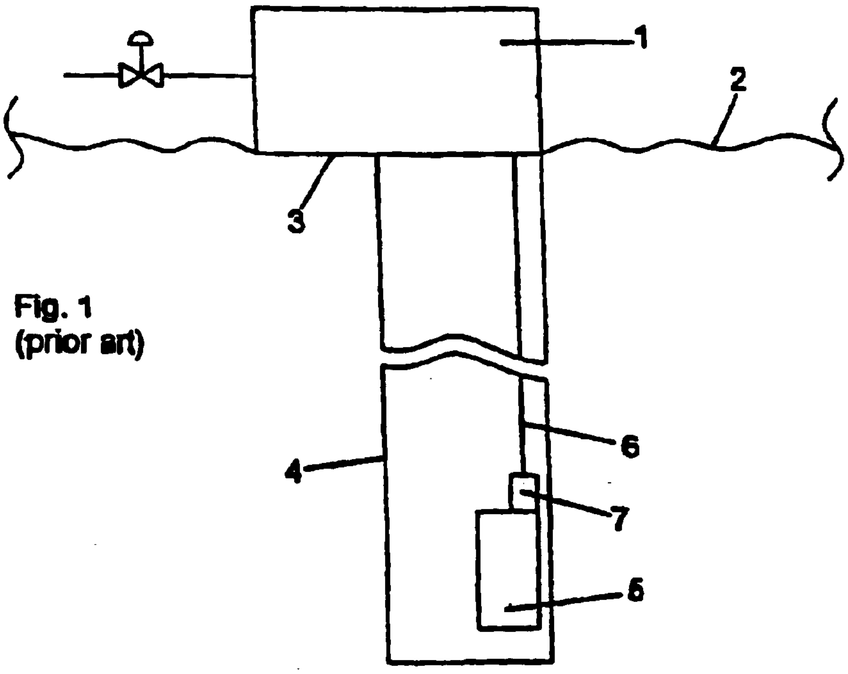
Fig. 1 (prior art)
FIG. 1 is a diagrammatic section of a sub-sea wellhead and hole liner (Prior Art)

In the following description, the same reference numeral is used for identical components or different components fulfilling an identical function.

The connector A will be described firstly in the assembled condition, to give an overall understanding, and then the method of assembly will be explained in detail.

Figure 2:
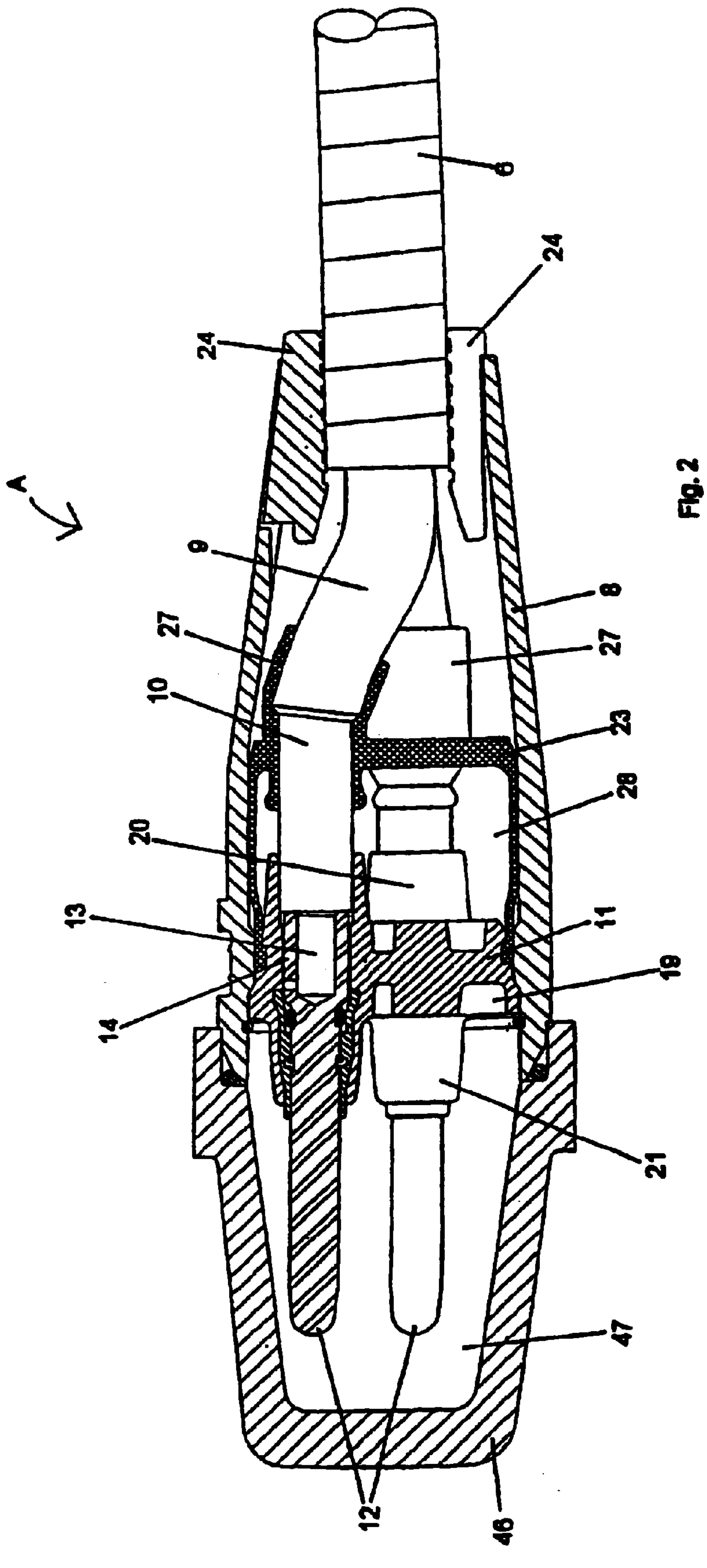
FIG. 2 is a sectional side elevation of an assembled connector according to the invention.
Figure 5:
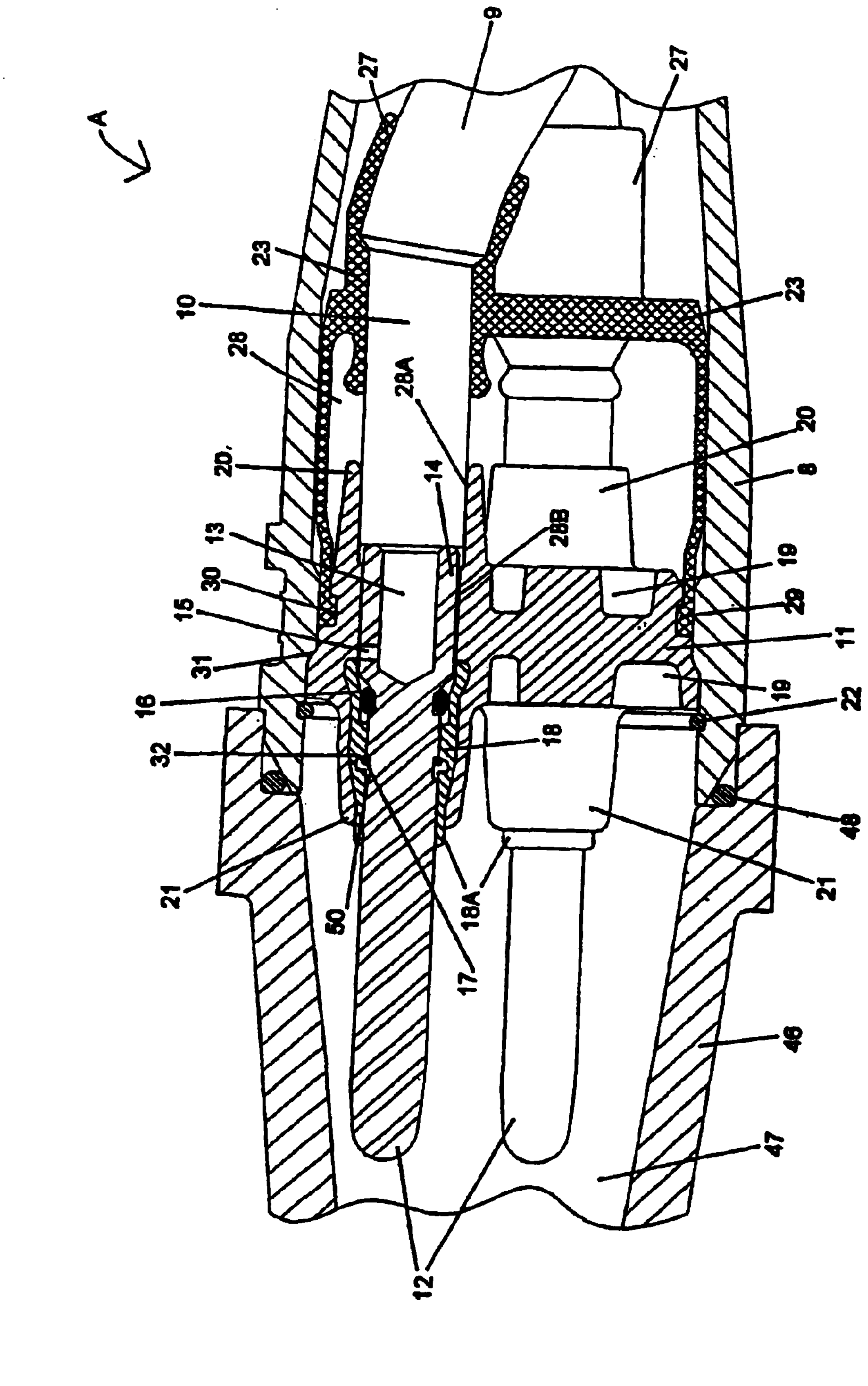
FIG. 5 is an enlarged par sectional side elevation of the connector shown in FIG. 2.

FIGS. 2 and 5 show armoured cable 6 passing into cable connector A. The particular connector shown has three pins 12 arranged in a triangle to match the socket 7 on ESP 5 (FIG. 1).

Armoured cable 6 passes through cable clamp 24 into connector housing 8. Beyond clamp 24, the armouring 6 is cut to reveal the lead sheathed conductors 9 which pass through collars 27 in flexible boot 23. Lead sheathing 9 is removed beyond the end of collar 27 to reveal insulation 10. The final section of insulation 10 is removed to reveal core 13 which is crimped in the annular space 14 in the end of contact pin 12. Drilling 15 is provided to view the end of core 13 to ensure that is in position before crimping.

Pin 12 is located positively by circlip 17 in metal sleeve 18 fist with insulator 11. Circlip 17 is essential to provide axial location of pin 12 but its presence generates high localised electrical stress concentrations. Metal sleeve 18 is an important feature as it dissipates these electrical stress concentrations and thus protects insulator 11. Collar 21 is an integral feature of insulator 11, mechanically and electrically supporting sleeve 18 whose annular nose 18A passes the electrical stresses smoothly into pins 1. O-rings 16 separate the insulating oil 47 from crimped joint 13, 14. Cavities 19 are provided to assist in ensuring uniform electrical insulating throughout insulator 11.

Flexible boot 23 covers the insulator 11 and crimped connections 13, 14 of each conductor. Boot 23 is secured to insulator 11 via ridge 29 engaging in annular groove 30. The space inside boot 23 is filled with a mechanically soft, essentially incompressible, electrically insulating substance 28, hereinafter referred to as a "gel."

The purpose of this gel 28 is both to provide electrical insulation and mechanical support for the insulated conductors 10 adjacent to the crimpled connection 13, 14. Annular collars 28B and 28A of gel are provided between annulus 14 and insulator body 11 and between insulated core 10 and insulator collar 20 respectively. The design of tapering collar 20 provides gradually increasing flexibility to bending with increasing distance from crimped joint 13, 14 so that external loads, applied via cable 6, cause progressive deflection along the whole length of insulated core 10 inside boot 23 rather than a sharp bend at a single point. Gel collars 28B and 28A contribute significantly to this aspect of the design.

The forms of insulating collars 20 and gel collars 28A and 28B are basically cylindrical but may be right cylinders or conical cylinders, or any combination of these forms. The combination of collars 20, 28A and 28B act together to support to the insulated cores inside boot 23 in a progressively cushioned manner. This minimises the reactions required from crimped joint 13, 14 and is important to guaranteeing the operating life of the connector A.

Of great importance is that the core insulation 10 sits deep inside the upstand of insulator collars 20 and gel collars 28A to create a good electrical interface with a long creepage distance. This is to accommodate the potential difference o, for example, 3000V at crimp 14 to earth on lead sheath 9. As gel 28 is filled at normal atmospheric pressure, the increased operating pressure will act to compress gel 28 into collars 28A and 28B, thus ensuring maximum electrical insulation.

Gel 28 also cushions cores 10 against changes in external pressure or rough handling of the connector A and cable 6. This is important as, in the extreme conditions in which the connectors operate and the very high levels of power being carried, any minor deviation from the insulation specification can lead to high electrical stresses, possible arcing and eventual failure. It is to address such failures that the connector of the invention has been devised and the attention to such details (20, 28A and 28B) is necessary to be able to guarantee that the operational life of connector 7 will exceed that of pump 5.

It is common to drill for oil in water over 1000 m deep where the pressure is over 100 atmospheres. The application of such pressure to boot 23 causes substance 28, 28A, 28B to 'flow', e.g. to compact into annuli 28A and 28B. A range of electrical insulators are suitable for gel 28, such as natural rubber, a soft resilient polymer, etc. A particularly preferred gel is a two part mixture of fluorosilicone.

A circlip 22 and co-operating shoulders 31 locate insulator 11 axially within housing 8. Cable 6 is secured in cable clamp 24 by two grub screws 25 which also lock clamp 24 axially in housing 8. This ensures that axial forces applied to cable 6 do not affect crimping 13, 14 or the engagement of pins 12 in their sockets (not shown). A protective transit cover 46, sealed with O-ring 48, is shown attached by bolts 49 to housing 8. When the connection 7 is made to ESP 5, bolts 49 and seal 48 are re-used. The void 47 inside connection 7 will be filled with electrically insulating oil and provided with pressure compensation from the motor head (not shown).

The connector just described is a precision item which, when made to ESP 5, will keep the medium in which pump 5 and connection 7 are operating out of the connector internals, irrespective of changes in external pressure. The dimensions and materials of construction of sleeves 18, collars 18A and insulator 11, including collars 20 and 21, have been carefully designed to minimise electrical stresses between the contact pins 12 (including annulus 14) and core insulation 10. As explained before, mechanical support for cores 10 is an integral part of the overall design.

The details of the assembly of connector A will now be described.

A number of special tools are provided to enable the connector A to be fitted. One of these, the Gel Filling Tool B (FIGS. 6 and 7), is used by the manufacturer but the rest are used on site. This procedure eliminates the need for precision workshop processes on site so that semi-skilled personnel can perform final assembly and yet produce a guaranteed precision connector. The principle of the procedure is:

Factory Assembly Processes:

i) Fitting boot 23 to insulator 11 and filling with gel 28 (special tool B);

ii) Placing circlips 17 into grooves 32 in sleeves 18;

iii) Fitting insulator-boot assembly into housing 8;

iv) Fitting seals 16 to pins 12; and v) Packing in sealed containers for delivery.

Site Assembly Processes:

i) Preparing cable, i.e.

Stripping armoured protection 6;

Preparing and removing predetermined lengths of lead sheathing (special tool C);

Stripping predetermined lengths of insulation 10 to expose cores 13;

Crimping exposed cores 13 into annulus 14 of contact pin 12 (special tool—not shown); and Bending to align the three cores to fit insulator-boot assembly (special tools and template D & E)

ii) Fit pins-conductors assembly through housing 8 into boot-insulator and ensuring positive engagement 17 and sealing 16; and iii) Securing cable clamp 24 to housing 8.

Figure 6:
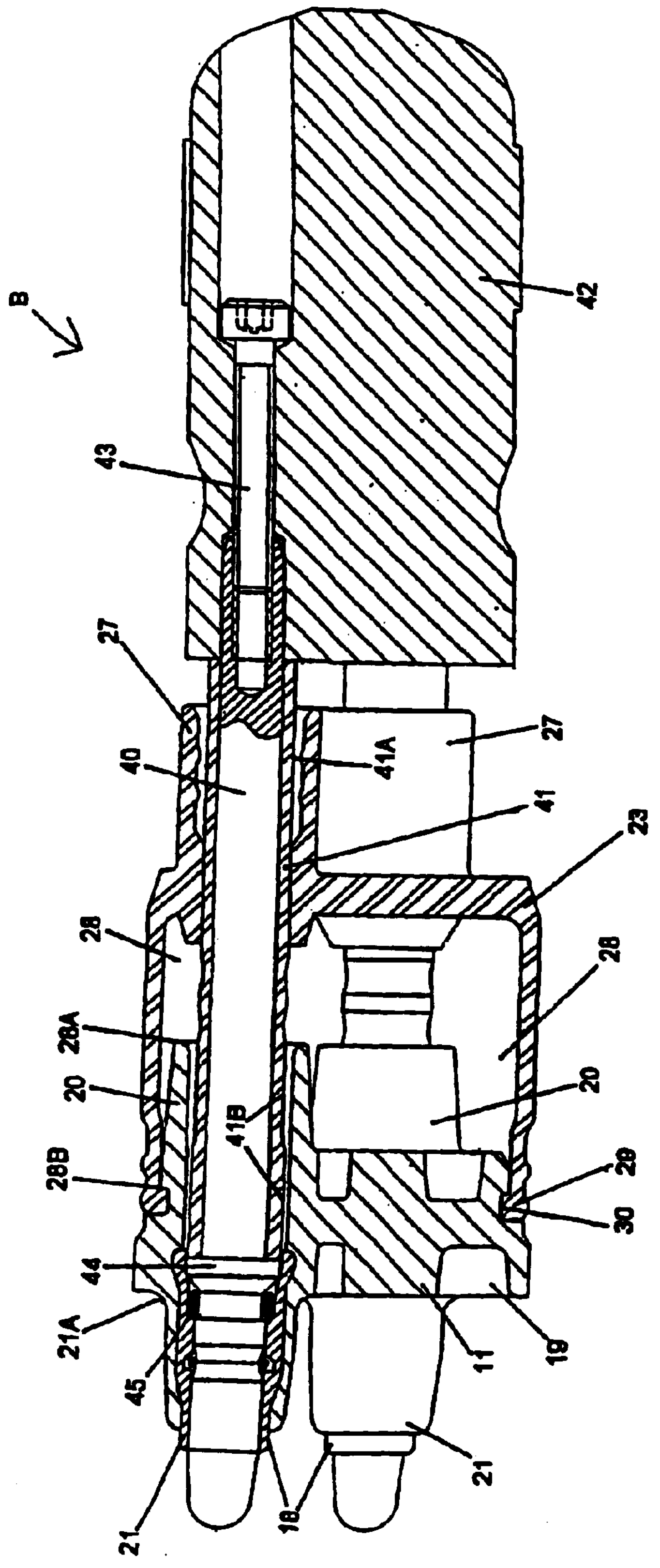
FIG. 6 is a part sectional elevation of a boot gel-filling tool of the invention.

Factory pre-assembly starts with fitting boot 23 to insulator 11 by engaging ridge 29 into groove 30. (Metal sleeves 18 are bonded to insulator 11 when the insulator is made, e.g. by a polymerisation process.) The gel filling tool B (FIGS. 6 & 7) consists of a handle 42 to which three pin formers 40 are secured 43. Pin formers 40 pass through collars 27 of boot 23. The section of pin former 40 inside boot 23 carries a sleeve 41. Parts of sleeve 41 are carefully profiled with some sections 41A to the full size of insulated core 10 and other sections 41B undersized, compared to that of insulated core 10 and contact pin 14. The undersized sections will allow gel annuli 28A and 28B to be created. Pin former sleeves 41 are coated with a release agent and inserted through collars 27 and sleeves 18 until flanges 44 contact the shoulders 18B, as shown (FIG. 6). Seals 45 retain the polymer mixture.

Figure 7:
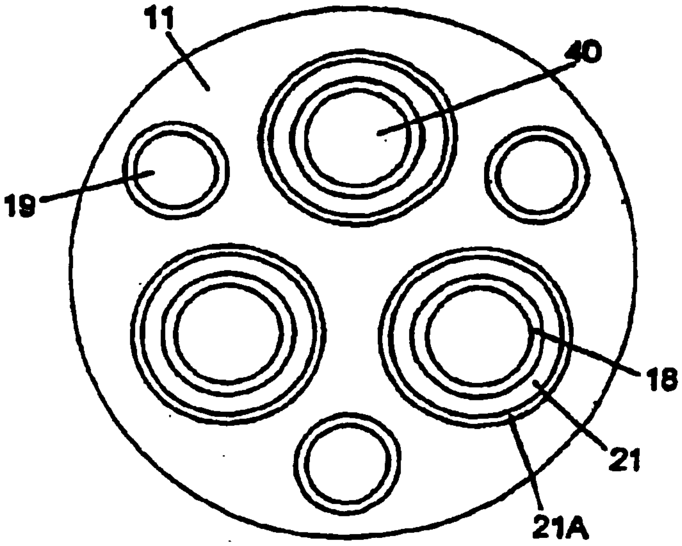
FIG. 7 is an end elevation of the boot gel filling tool shown in FIG. 6 looking in thee direction of arrow B.

FIG. 7 shows the end of tool B and insulator 11 as seen from the direction of arrow B. The ends of pin formers 40, sleeves 18, collars 21 and the fairings 21A of collar 21 into insulator 11 are shown. Cavities 19, again with fairings, are also shown.

The unpolymerised gel solution and hardener are mixed and injected into boot 23 via an aperture (not shown) to fill completely the space 28 inside boot 23 between pin former surfaces 41, 41A and 41B including annuli 28A and 28B. The polymer mixture as a low viscosity so completely fills all internal voids, including annuli 28A and 28B and is injected slowly, to avoid incorporation of air bubbles, until excess emerges from an appropriate point, e.g. one of the collars 27. During filling, the whole is gently rotated and tilted to ensure complete filling without entrapping air bubbles. When full, the whole assembly is placed in an oven and gently-cured.

When fully cured, the assembly is removed from the oven and tool B removed from the insert assembly. Because a release agent is used, the polymerised gel will not adhere to surfaces 41 but will bond strongly to insulator 11. Should a problem occur during tool removal, it can be dismantled 43 and any sticking pins gently rotated to free them.

Figure 8:
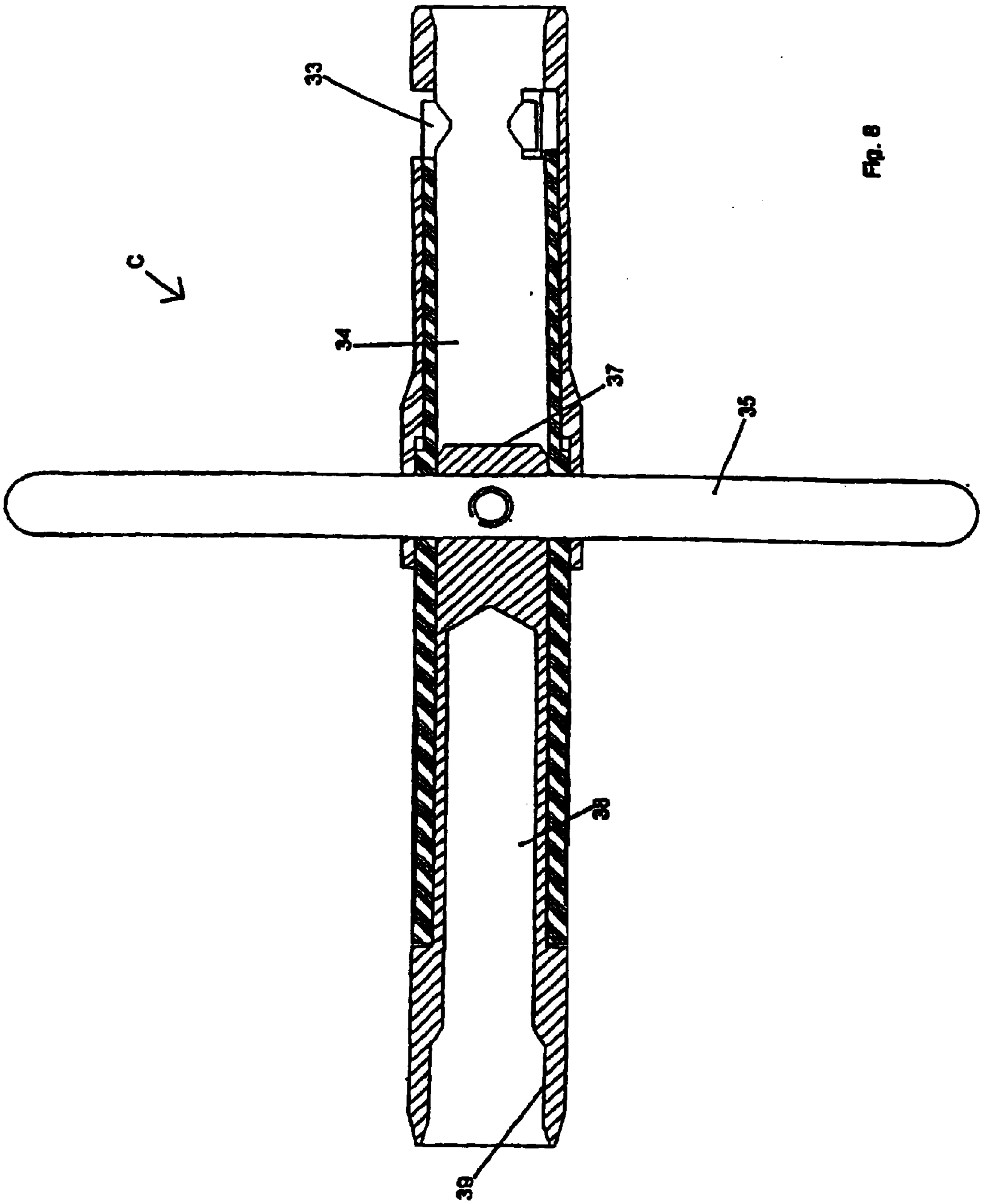
FIG. 8 is a sectional elevation of a core stripping tool of the invention.
Figure 9:
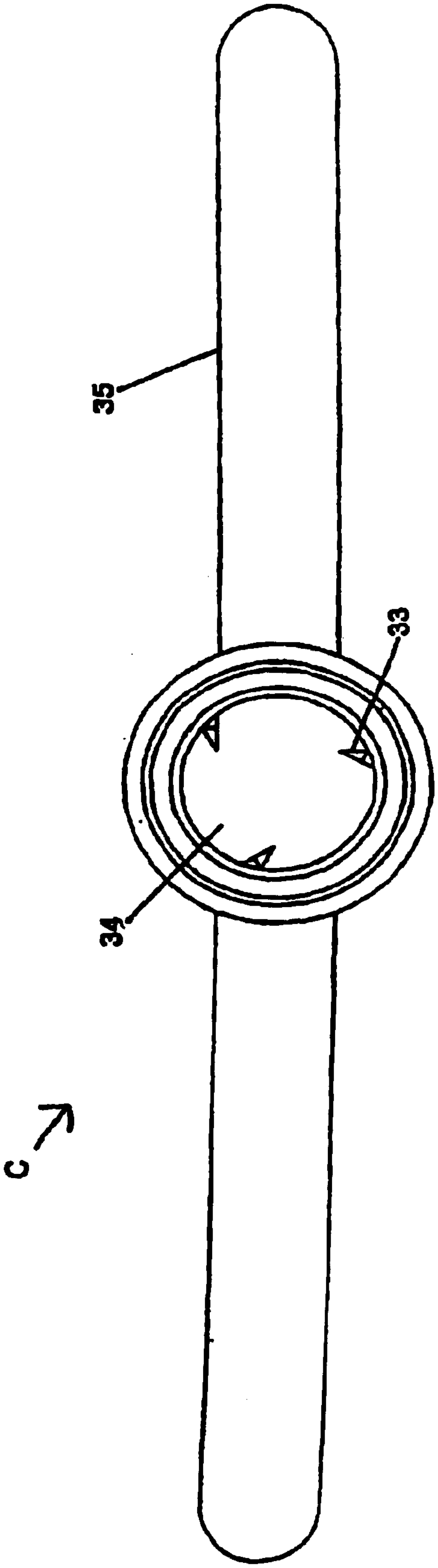
FIG. 9 is an end elevation of the core stripping tool shown in FIG. 8.
Figure 10:
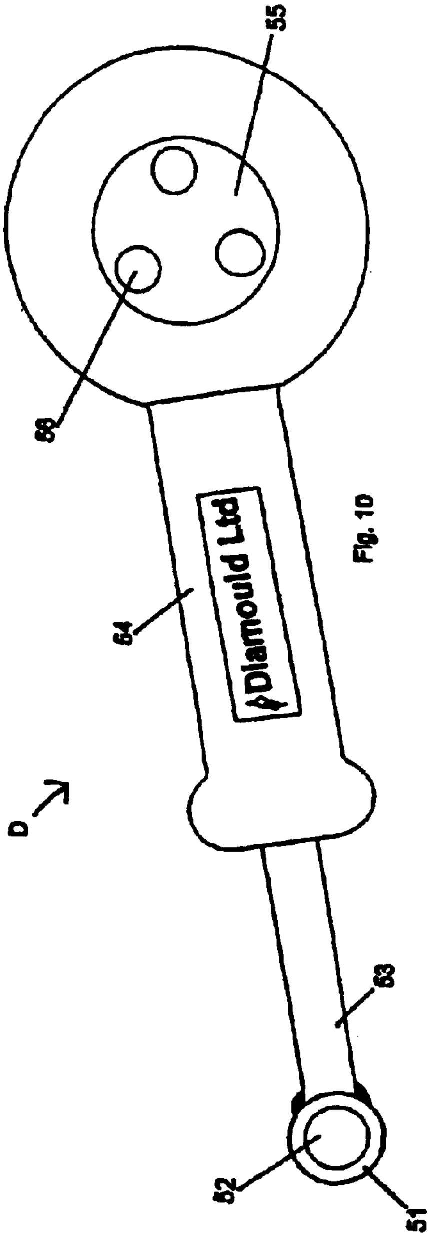
FIG. 10 is a plan view of a core bending tool of the invention, including core a template.
Figure 11:
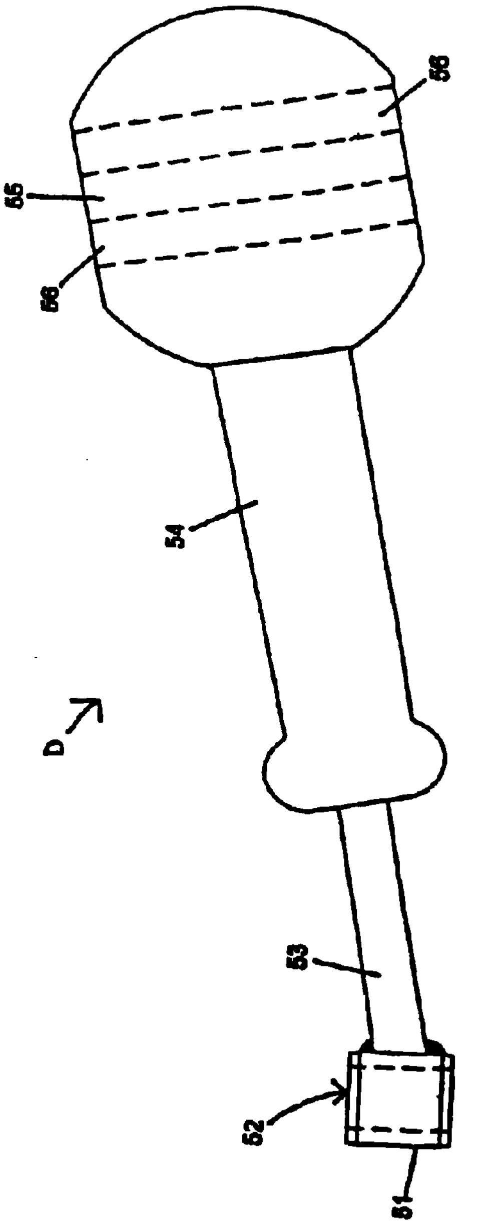
FIG. 11 is a side elevation of the core bending tool of FIG. 10.
Figure 12:
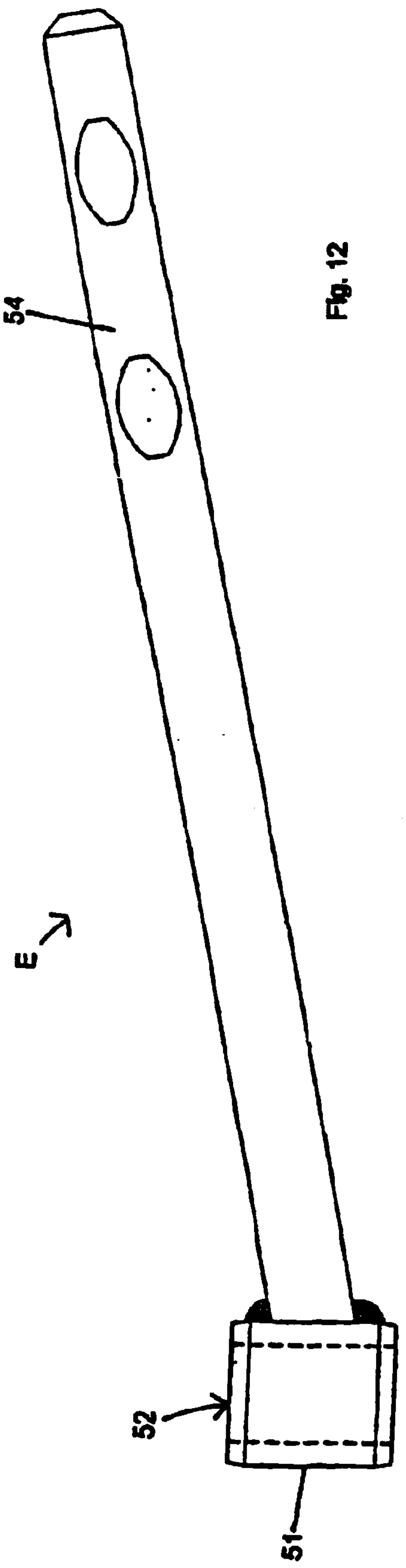
FIG. 12 is a side elevation of a core bending tool of the invention without a core template.

Site assembly uses stripping tool C (FIGS. 8 and 9) and cable bending tools D & E, (FIGS. 10–12).

The end of cable 6 is placed in a vice and cut square. A predetermined length of armouring 6 is removed and the three cores gently separated. The cable lengths are marked off, using a template (not shown). Tool C is used to prepare pre-determined lengths of lead sheath conductors 9. Sheathing 9 often has a square section and must be rounded to fit collars 27 of boot 23. This is done by running smoothing tool 39 (FIG. 8) down the conductor until the cut end reaches the limit of hole 38. Handle 35 is provided to turn 36 tool C. This is repeated for each conductor 9.

Now tool C is reversed and blind annular hole 34 slipped over lead sheathing 9 up to stop 37, i.e. the end of blind hole 34. Inside hole 34, cutters 33 score sheathing 9 axially, as the cable is pushed in to stop 37. Then tool C is rotated 36 using handle 35, to cut sheathing 9 circumferentially. Removal of the cable from hole 34, allows the cut sheathing to be peeled away, exposing insulation 10. A length of insulation 10 equal to the axial depth of crimping annular space 14 is now removed exposing core 13. This may be done with a knife or special tool (not shown). The exposed end 13 is now ready for crimping 14 to pin 12. Drilling 15 permits checking that the correct length of insulation 10 has been removed.

The description above is given for armoured, lead sheathed cable commonly used for downhole operations. Another form of armoured cable used for this application has double annular layers of polymeric insulation. For this latter case, a modified tool C is provided to remove only the outer layer if insulation.

Contact pins 12 are crimped onto the exposed ends of cores 13. A precision crimping tool (not shown) with hexagonal dies is preferred. Drilling 15 allows a check to be made that cores 15 are fully inserted into sleeve 14 before crimping.

Tools D and E (FIGS. 10–12) are used to bend cores 9, 10 to fit insulator 11. Both tools D and E consist of a short hollow cylinder 51, with bores 52, fast with an extended member 53 attached to a handle 54. Bores 52 fit over pins 12, 14 (including O-ring 16), cores 10 and lead sheathing 9 and the two tools, D and E, are used together as levers to bend sheathing 9 (and insulated cores 10) so that the three insulated cores 10 and pins 12 are parallel to each other. A template 55, with holes 56, is provided to align pins 12 and insulated cores 10 to fit boot 23 and insulator 11. It will be noted that template 55 has considerable depth 57 to ensure that pins 12 and insulated cores 10 are properly parallel and correctly spaced along their fill exposed length.

Figure 3:
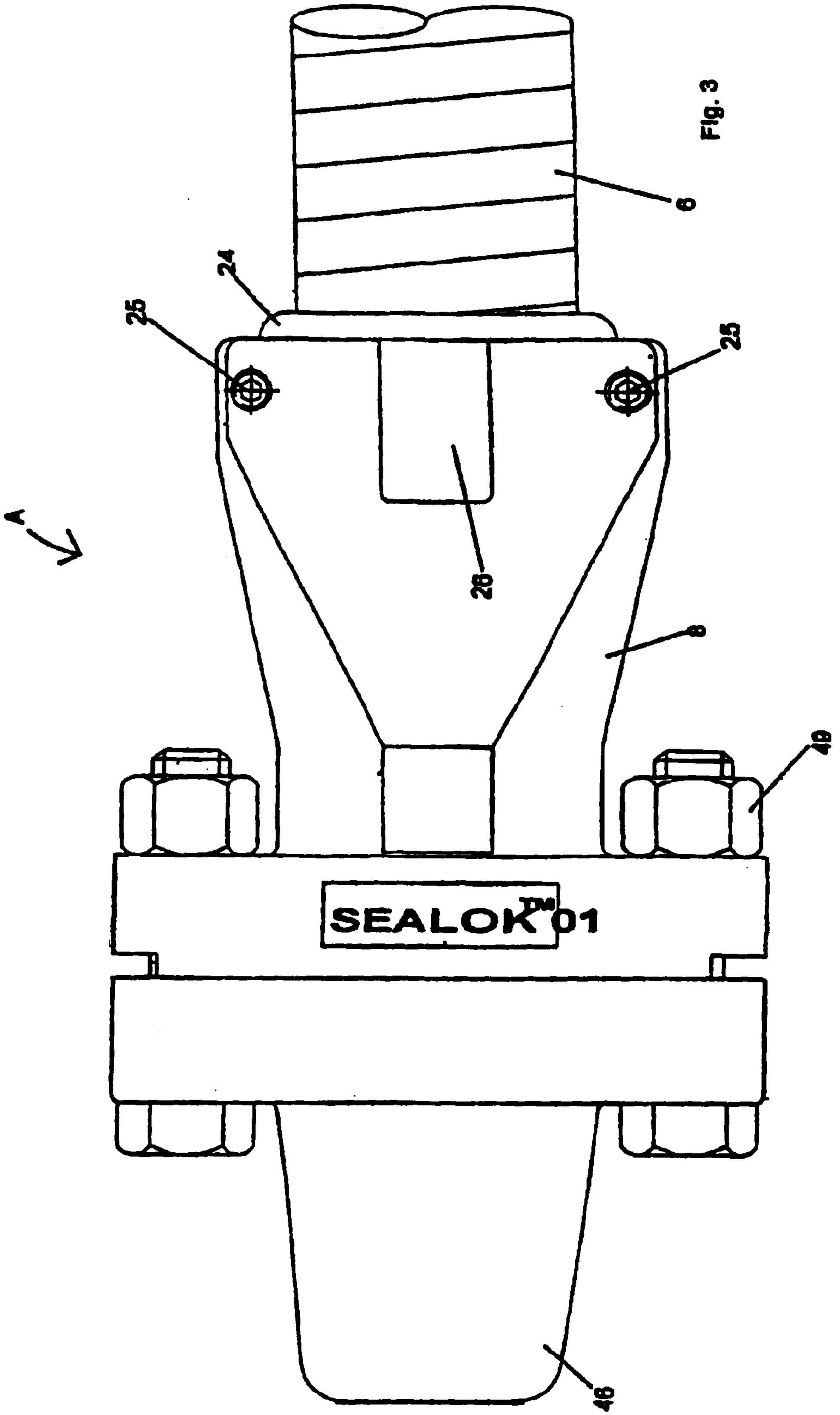
FIG. 3 is a plan view of the connector shown in FIG. 2.
Figure 4:
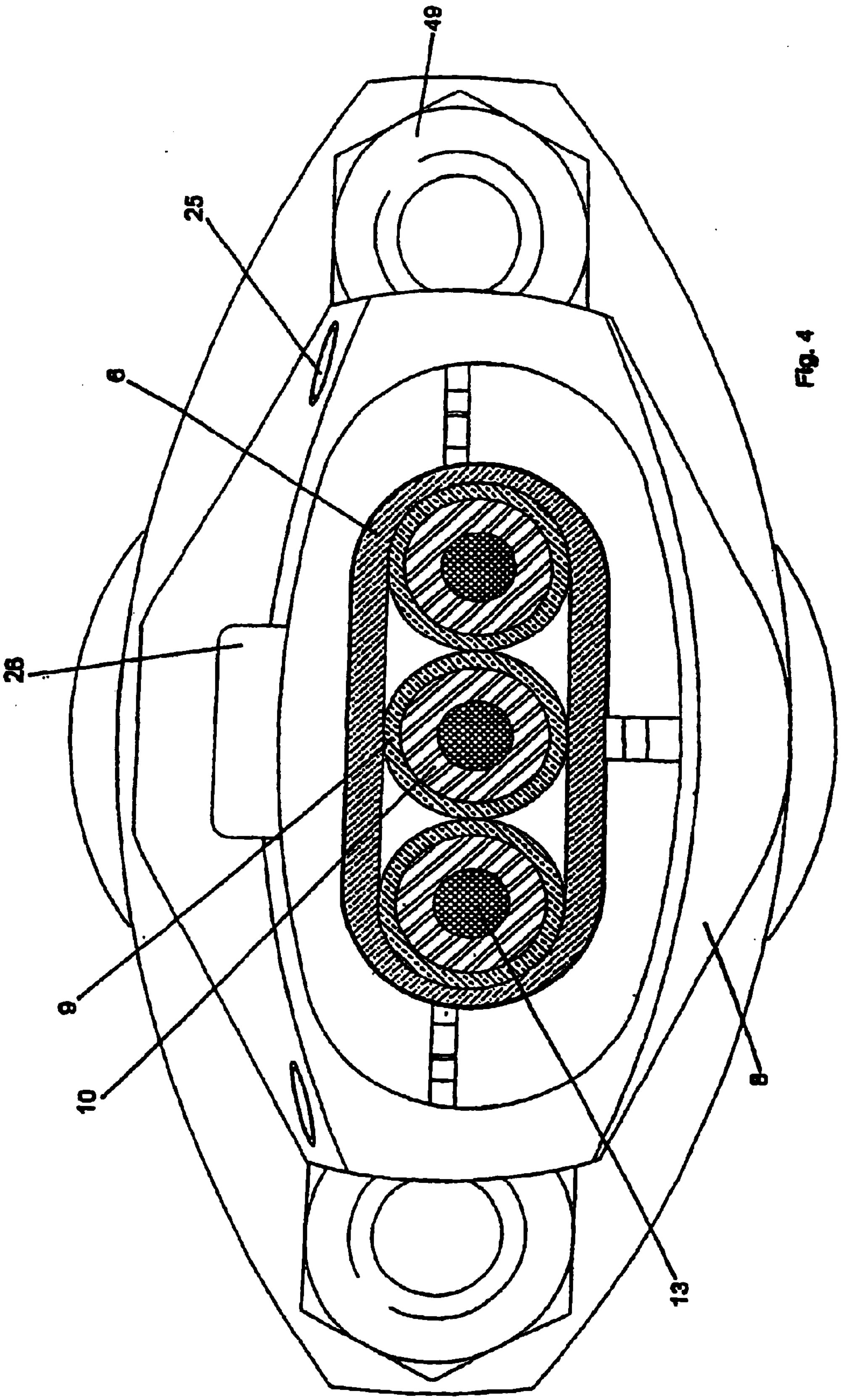
FIG. 4 is a sectional end elevation of the connector shown in FIG. 2 along the line AA.

The three pins 12 and insulated cores 10 are passed into housing 8 through the cable hole. A cut out (not shown but covered by cut out 26 (FIG. 3)) is provided in housing 8 to allow top contact pin 12 (hatched FIGS. 2 and 5) to enter without affecting the parallel core alignment. Pins 12, 14 and cores 10 enter collars 27, pass through pre-formed holes in gel 28, through collars 20, 28A, 28B and into insulator 11. Light greasing or an oil spray lubricant may be used to ease the passage through gel 28 into insulator 11. The rounded ends of pins 12 enter circlips 17 and the bodies of the pins slide through until the circlips lock into grooves 50. Insulated cores 10 can be pushed gently in via cable 6 as well as pulled, via pins 12, when they emerge through insulator 11. O-ring 16 will contact sleeve 18 forming a seal between oil-filled space 47 and crimped connection 13, 14.

Axial clearance is provided in circlip grooves 50 and 32 to ensure that pins 12 lock into position irrespective of any minor differences in the axial length of insulated cores 10 or in the crimping 13, 14. This is a further demonstration of the attention to detail in the design and method of the invention to guarantee a connection which is mechanically and electrically ideal for its purpose.

Cable clamp 24 is fitted and secured 25. A lug 26 covers the cut out (not shown) in housing 8.

The detail of the method of assembly is summarised as follows:

Factor Pre-assembly Stages:

1. Fit boot 23 to insulator 11 and fill boot void 28 with gel using filling tool B with pin formers 40, 41. Polymerise filling gel. Remove filling tool B with pin formers 40, 41.
2. Fit pin-locking circlips 17 in sleeves 18.
3. Insert insulator-boot assembly into housing 8 against shoulder 31. Insert locking circlip 22.
4. Fit O-rings 16 to pins 12 and package.
5. Package housing assembly 8, including cable clamp 24.

Site Assembly Stages:

1. Place cable 6 in a vice and cut end square.
2. Strip armoured protection 6 back to a pre-determined length. Gently move insulated cores 10 apart.
3. Smooth lead sheathing 9 to give a round section (using tool C) and strip lead sheathing 9 from a pre-determined length of all three cores (again using tool C).
4. Strip insulation 10 to expose a pre-determined length of core 13, using a knife or a stripping tool (not shown).
5. Fit exposed core 13 filly into annular space 14 in pin 12 (so that core is fully home 15 and insulation 10 abuts pin 12) and crimp using an hydraulic-crimping tool. Repeat for the other connectors.
6. Bend cores 9 and 10, using tools D and E, so that pins 12 and insulated cores 10 are parallel to each other and align with template 55.
7. Fit contact pin-insulated core assembly into collars 27 in boot 23 inside housing 8 so that pins 12 pass into sleeves 18. Gently push and pull pins 12 until circlips 17 engage in the pin locking grooves and O-rings 16 are properly seated.
8. Fit cable clamp 24.
9. Fit protective cover 46 with O-ring 48, if appropriate.
10. The connector of the invention has been described with respect to a motor lead extension connection 7 for an electrically submerged pump 5 in an oil production well. This is a particularly arduous application where exceptional reliability is required without any maintenance being possible. The connector of the invention and method of using it are equally applicable to other situations where, though the environment is not so severe, extreme reliability is essential.

What is claimed is:

1. An electrical connector connecting a cable to a power item or further connector comprising:

i) a multicolored, insulated electrical cable;

ii) electrical connections securing individual cores to individual contact pins;

iii) said individual contact pins positively engageable within an insulating member;

iv) a flexible boot, defining, with the insulating member, an interior which is filled with a mechanically soft, essentially incompressible, electrically insulating substance;

v) a housing providing a seal with the insulating member and also with the power item or further connector; and vi) a clamp able to grip and secure the electrical cable into the housing;

wherein annular channels are provided between the insulating member and the contact pins, the mechanically soft, essentially incompressible, electrically insulating substance forming cushioning in the annular channels, the connector being arranged so that, when assembled, where external forces are placed on the connector via the cable, they are dissipated progressively over an extended length of insulated cores inside the connector and where the ends of the contact pins are secured to the cable cores are connectable to the power item or further connector.

2. An electrical connector as claimed in claim 1, wherein the annular channels are in communication with the interior.

3. An electrical connector as claimed in claim 2, wherein the means of securing the individual cores to the individual contact pins is crimping.

4. An electrical connector as claimed in claim 3, wherein metal sleeves are provided in the insulating member to promote positive engagement of the individual contact pins in the insulating member.

5. An electrical connector as claimed in claim 4, wherein the positive engagement of each individual contact pin in each metal sleeve in the insulating member is via a circlip.

6. An electrical connector as claimed in claim 5, wherein a circlip groove in the metal sleeve provides freedom for the circlip to move in the axial direction.

7. An electrical connector as claimed in claim 1, further comprising means for sealing the electrical connections from the external environment.

8. An electrical connector as claimed in claim 1, wherein the insulating member is provided with annular upstand surrounding the individual insulated core where they enter the insulating member.

9. An electrical connector as claimed in claim 8, wherein the annular upstand are cylindrical in form.

10. An electrical connector as claimed in claim 8, wherein the annular upstand are in the form of conical cylinders.

11. An electrical connector as claimed in claim 1, wherein the mechanically soft, essentially incompressible, electrically insulating substance is cast in position as a liquid monomer and subsequently polymerized.

12. An electrical connector as claimed in claim 1, wherein annular channels are also provided between parts of the insulating member and the insulation of said insulated portions of the cores, the mechanically soft, essentially incompressible, electrically insulating substance forming cushioning in the annular channels.

13. An electrical connector as claimed in claim 12, wherein the annular channels are right cylindrical in form.

14. An electrical connector as claimed in claim 12, wherein the annular channels are in the form of conical cylinders.

15. An electrical connector as claimed in claim 1, wherein the annular channels are right cylindrical in form.

16. An electrical connector as claimed in claim 1, wherein the annular channels are in the form of conical cylinders.

17. A method of making an electrical connection comprising the steps of:

i) providing components for the connection;

ii) fitting a flexible boot over an insulating member;

iii) filling the void inside the boot with a mechanically soft, essentially incompressible, electrically insulating substance in such a way that space is provided for contact pins and insulated cores to be fitted at a subsequent time;

iv) fitting the filled insulating member-boot sub-assembly into a housing and creating a seal between the sub-assembly and the housing;

v) taking a multicolored electrical cable and cutting to length;

vi) placing a cable grip over the cable;

vii) preparing an appropriate length of insulation on each conductor and baring the requisite length of each core;

viii) inserting each bared conductor into, a prepared part of a contact pin and securing in position;

ix) bending the conductor-pin assemblies to align the conductors and pins to fit the spaces provided in the boot and mechanically soft, essentially incompressible, electrically insulating substance and insulating member;

x) inserting each contact pin and connector sub-assembly through holes in the boot, through passages in the mechanically soft, essentially incompressible, electrically insulating substance and into the insulating member;

xi) causing the contact pins to engage positively with the insulating member and form a seal with the insulating member; and xii) securing the cable clamp.

18. A method of making an electrical connection as claimed in claim 17, wherein a forming tool is used during the filling of the flexible boot with polymerisable liquid monomer to define the passage through which the individual contact pin and connected insulated core will pass after the monomer has polymerized.

19. A method of making an electrical connection as claimed in claim 18, wherein the liquid monomer is placed inside the flexible boot in a way to avoid the incorporation of air bubbles into the monomer.

20. A method of making an electrical connection as claimed in claim 19, wherein the liquid monomer is placed inside the flexible boot using a syringe prior to polymerization.

21. A method of making an electrical connection as claimed in claim 19, wherein the flexible boot and tool assembly is rotated or tilted gently in order to ensure that the liquid monomer completely fills the internal space inside the flexible boot.

22. A method of making an electrical connection as claimed in claim 17, wherein a release agent is applied to the forming members of the forming tool to promote releasing of the forming members after the liquid monomer has polymerized.

23. A method of making an electrical connection as claimed in claim 17, wherein a hydraulic crimping tool is used to crimp the bared cores to the contact pins.

24. A method of making an electrical connection as claimed in claim 17, wherein tools are used for aligning the plurality of contact pins and connected insulated cores with the passages in the mechanically soft, essentially incompressible, electrically insulating substance and in the insulating member.

25. A method of making an electrical connection as claimed in claim 24, wherein one of the alignment tools incorporates a template for aligning the contact pins and connected insulated cores with the passages in the mechanically soft, essentially incompressible, electrically insulating substance and in the insulating member.

26. An electrical connector connecting a cable to a power item or further connector comprising:

i) a multicolored, insulated armoured electrical cable;

ii) electrical connections securing individual cores being crimped to individual contact pins;

iii) said contact pins positively engageable within an insulating member;

iv) a flexible boot, filled with a mechanically soft, essentially incompressible, electrically insulating substance;

v) a housing providing a seal with the insulating member and also with the power item or further connector;

vi) a clamp able to grip and secure the electrical cable into the housing; wherein the connector is arranged so that, when assembled, where external forces are placed on the connector via the cable, such forces are dissipated progressively over an extended length of the insulated cores inside the connector, and the ends of the contact pins secured to the cable cores are connectable to the power item or further connector; and vii) a metal sleeve and circlip cooperating to promote positive engagement of the individual contact pins in the insulating member.

27. The electrical connector of claim 26, wherein the metal sleeve has a groove allowing the circlip to move in the axial direction.

* * * * *